United States Patent
Nagahara et al.

(10) Patent No.: US 10,124,816 B2
(45) Date of Patent: Nov. 13, 2018

(54) COLLISION ENERGY ABSORBING DEVICE OF RAILCAR

(71) Applicant: KAWASAKI JUKOGYO KABUSHIKI KAISHA, Kobe-shi, Hyogo (JP)

(72) Inventors: Hitoshi Nagahara, Kobe (JP); Toshiyuki Hirashima, Kobe (JP); Shirou Honma, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 136 days.

(21) Appl. No.: 15/038,824

(22) PCT Filed: Dec. 18, 2013

(86) PCT No.: PCT/JP2013/007439
§ 371 (c)(1),
(2) Date: May 24, 2016

(87) PCT Pub. No.: WO2015/092832
PCT Pub. Date: Jun. 25, 2015

(65) Prior Publication Data
US 2016/0375913 A1    Dec. 29, 2016

(51) Int. Cl.
*B61D 15/06*        (2006.01)
*F16F 7/12*         (2006.01)

(52) U.S. Cl.
CPC .............. *B61D 15/06* (2013.01); *F16F 7/12* (2013.01)

(58) Field of Classification Search
CPC ......... B61D 15/06; B61F 19/04; B61G 11/18; F16F 7/00; F16F 7/12
See application file for complete search history.

(56) References Cited

U.S. PATENT DOCUMENTS 6,167,815 B1 * 1/2001 Werner .................. B61F 19/04
                                                    105/392.5
2010/0218701 A1 * 9/2010 Graf ....................... B61D 15/06
                                                    105/392.5
(Continued)

FOREIGN PATENT DOCUMENTS

JP          S60-138043 U    9/1985
JP          2000-506473 A   5/2000
(Continued)

OTHER PUBLICATIONS

Mar. 4, 2014 Search Report issued in International Patent Application No. PCT/JP2013/007439.
(Continued)

*Primary Examiner* — Jason C Smith
(74) *Attorney, Agent, or Firm* — Oliff PLC

(57) ABSTRACT

A collision energy absorbing device configured to realize stable and highly-efficient energy absorption by adequate destruction of reinforced fibers at the time of collision. A collision energy absorbing device of a railcar includes: an absorber made of fiber-reinforced resin and provided so as to extend in a rail direction; a base member supporting a rear end portion of the absorber in the rail direction; a front plate member not fixed to a front end portion of the absorber and provided so as to face the front end portion of the absorber from a front side; and a holding device configured to position the front plate member such that the front plate member aces the front end portion of the absorber from the front side.

16 Claims, 5 Drawing Sheets

(56) References Cited

U.S. PATENT DOCUMENTS

| | | | |
|---|---|---|---|
| 2012/0325108 A1* | 12/2012 | Graf | B61D 15/06 105/392.5 |
| 2013/0233200 A1* | 9/2013 | Taguchi | B61D 15/06 105/392.5 |
| 2013/0239847 A1* | 9/2013 | Taguchi | B61D 17/06 105/392.5 |
| 2014/0020596 A1* | 1/2014 | Graf | B61D 15/06 105/392.5 |
| 2014/0033949 A1* | 2/2014 | Prockat | B61D 17/041 105/392.5 |
| 2014/0261073 A1* | 9/2014 | Cook | F01N 3/20 105/392.5 |
| 2016/0096534 A1* | 4/2016 | Graf | B61D 15/06 105/392.5 |
| 2016/0152247 A1* | 6/2016 | Sano | B61D 15/06 105/392.5 |
| 2016/0375913 A1* | 12/2016 | Nagahara | B61D 15/06 105/392.5 |

FOREIGN PATENT DOCUMENTS

| | | | |
|---|---|---|---|
| JP | 2010-125858 A | 6/2010 | |
| JP | 2012-502833 A | 2/2012 | |

OTHER PUBLICATIONS

Jun. 21, 2016 International Preliminary Report on Patentability issued in International Patent Application No. PCT/JP2013/007439.

* cited by examiner

COLLISION ENERGY ABSORBING DEVICE OF RAILCAR

TECHNICAL FIELD

The present invention relates to a collision energy absorbing device configured to be crushed by a load from a front side at the time of collision of a railcar to absorb collision energy.

BACKGROUND ART

Known is a collision energy absorber attached to a front portion of a carbody of a railcar and configured to absorb collision energy to protect crews and passengers when, for example, railcars collide head-on with each other or a railcar collides with an obstacle. Such energy absorber is typically constituted by a hollow columnar member made of metal and is provided such that an axial direction of the energy absorber coincides with a forward/rearward direction of the carbody. With this, when the collision energy absorber collides with the obstacle, the collision energy absorber gradually buckles in the axial direction to deform in an accordion shape. Thus, the collision energy absorber absorbs the collision energy to reduce an impact transmitted to the carbody.

The collision energy to be absorbed at the time of the collision of the railcar is extremely larger than the collision energy to be absorbed at the time of the collision of an automobile or the like. Therefore, a capacity of the collision energy absorber needs to be increased. However, just increasing the capacity causes a significant weight increase. Therefore, in recent years, collision energy absorbers made of fiber-reinforced resin have been proposed to satisfy a requirement of weight reduction (see PTL 1, for example). The amount of energy absorption per unit weight of such collision energy absorber made of fiber-reinforced resin can be made larger than the amount of energy absorption per unit weight of the conventional collision energy absorber made of metal. Thus, the weight reduction is realized.

CITATION LIST

Patent Literature

PTL 1: Published Japanese Translation of PCT Application No. 2012-502833

SUMMARY OF INVENTION

Technical Problem

Unlike the collision energy absorber made of metal, the collision energy absorber made of fiber-reinforced resin does not absorb the energy mainly by sequential buckling. The collision energy absorber made of fiber-reinforced resin absorbs the energy mainly in such a manner that reinforced fibers of the collision energy absorber are continuously destroyed. The present inventors have diligently studied to realize highly-efficient and stable energy absorption. As a result, the present inventors have reached a conclusion that it is important to prevent a case where unintended buckling deformation of the collision energy absorber made of fiber-reinforced resin occurs, and the reinforced fibers are not destroyed adequately.

An object of the present invention is to provide a collision energy absorbing device configured to realize stable and highly-efficient energy absorption in such a manner that reinforced fibers of the collision energy absorbing device are adequately destroyed at the time of collision.

Solution to Problem

A collision energy absorbing device of a railcar according to the present invention includes: an absorber made of fiber-reinforced resin and provided so as to extend in a rail direction; a base member supporting a rear end portion of the absorber in the rail direction; a front plate member not fixed to a front end portion of the absorber and provided so as to face the front end portion of the absorber from a front side; and a holding device configured to position the front plate member such that the front plate member faces the front end portion of the absorber from the front side.

According to the above configuration, the front plate member is not fixed to the front end portion of the absorber made of fiber-reinforced resin and is provided so as to face the front end portion of the absorber from the front side. Therefore, at the front end portion of the absorber, the reinforced fibers of the absorber are prevented from being strongly restrained by the front plate member. With this, the unintended buckling deformation of the absorber by the displacement of the front plate member at the time of the collision is suppressed, and the reinforced fibers of the absorber can be adequately destroyed. The front plate member is positioned by the holding device so as to face the front end portion of the absorber from the front side. Therefore, even though the front plate member is not fixed to the absorber, the front plate member can be caused to stand by for the collision so as to face the absorber from the front side.

Advantageous Effects of Invention

As is clear from the above explanations, the present invention can realize stable and highly-efficient energy absorption by adequate destruction of reinforced fibers at the time of collision.

DESCRIPTION OF EMBODIMENTS

Hereinafter, an embodiment will be explained in reference to the drawings.

Figure 1:
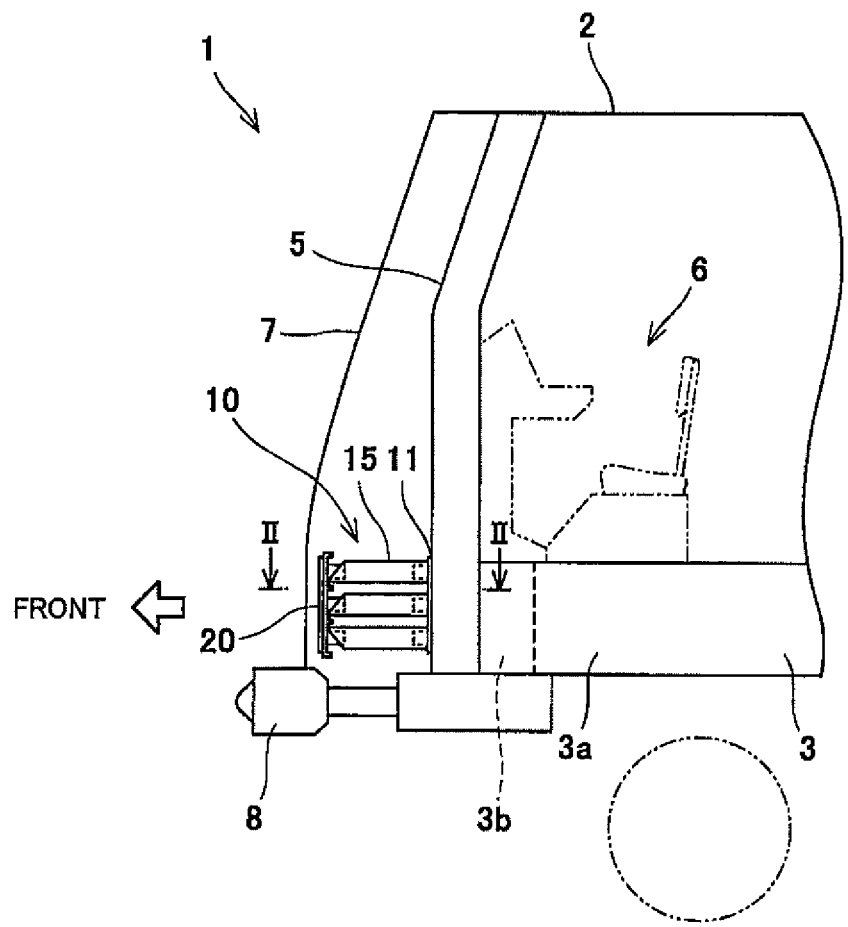
FIG. 1 is a cross-sectional view showing a head portion of a railcar including a collision energy absorbing device according to an embodiment.
Figure 2:
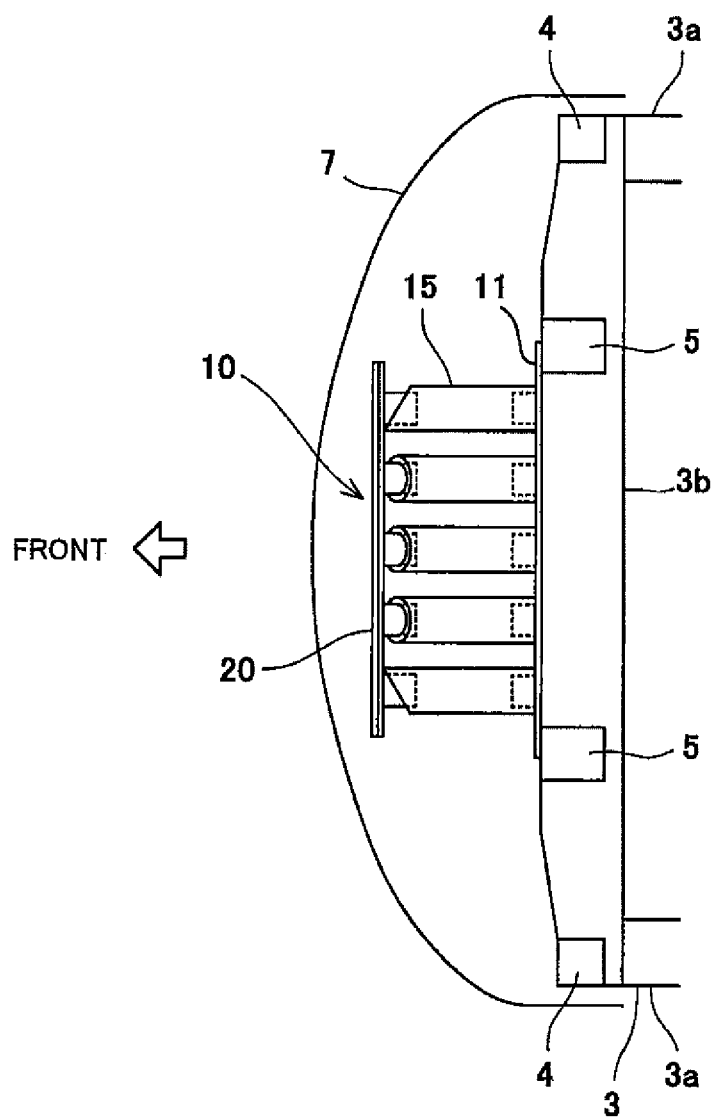
FIG. 2 is a cross-sectional view taken along line II-II of FIG. 1.

FIG. 1 is a cross-sectional view showing a head portion of a railcar 1 including a collision energy absorbing device 10 according to an embodiment. FIG. 2 is a cross-sectional view taken along line II-II of FIG. 1. As shown in FIGS. 1 and 2, the collision energy absorbing device 10 is fixed to a front portion of a bodyshell 2 of a head car of the railcar 1 so as to project in a forward direction. With this, for example, when cars traveling on the same railway track collide head-on with each other or a car collides with an obstacle, the collision energy absorbing device 10 is crushed by a load from a front side to absorb collision energy.

The bodyshell 2 includes an underframe 3. The underframe 3 includes: a pair of left and right side sills 3a extending in a forward/rearward direction; and an end beam 3b coupling front ends of the left and right side sills 3a to each other and extending in a leftward/rightward direction. Lower end portions of corner posts 4 extending in an upward/downward direction are joined to left and right end portions of the end beam 3b, and lower end portions of a pair of collision posts 5 are joined to a leftward/rightward direction intermediate portion of the end beam 3b. A driver's seat 6 is provided in an interior located behind the collision posts 5.

A front outside plate 7 constituting a frontmost surface of the bodyshell 2 is provided in front of the collision posts 5 so as to be spaced apart from the collision posts 5 in the forward/rearward direction. A coupler 8 projecting in the forward direction beyond the front outside plate 7 is fixed to the end beam 3b. The collision energy absorbing device 10 is located in front of the end beam 3b to be fixed to the collision posts 5. To be specific, the collision energy absorbing device 10 projects in the forward direction from the underframe 3. The collision energy absorbing device 10 does not contact the front outside plate 7, and a gap is formed between the collision energy absorbing device 10 and the front outside plate 7. To be specific, in the present embodiment, the coupler 8 projects in the forward direction beyond the collision energy absorbing device 10.

Figure 3:
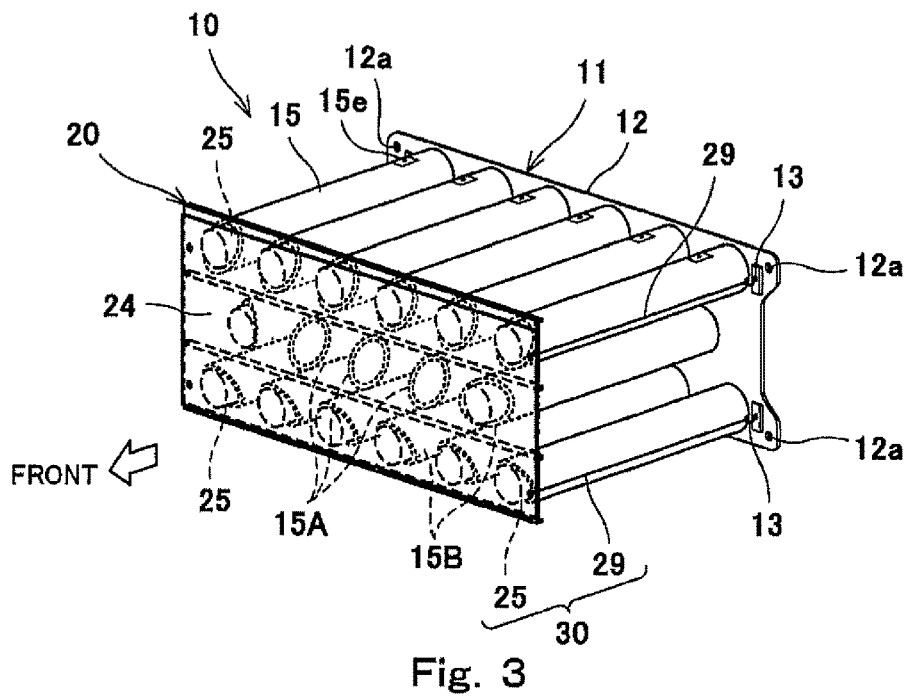
FIG. 3 is a perspective view of the collision energy absorbing device shown in FIG. 1.
Figure 4:
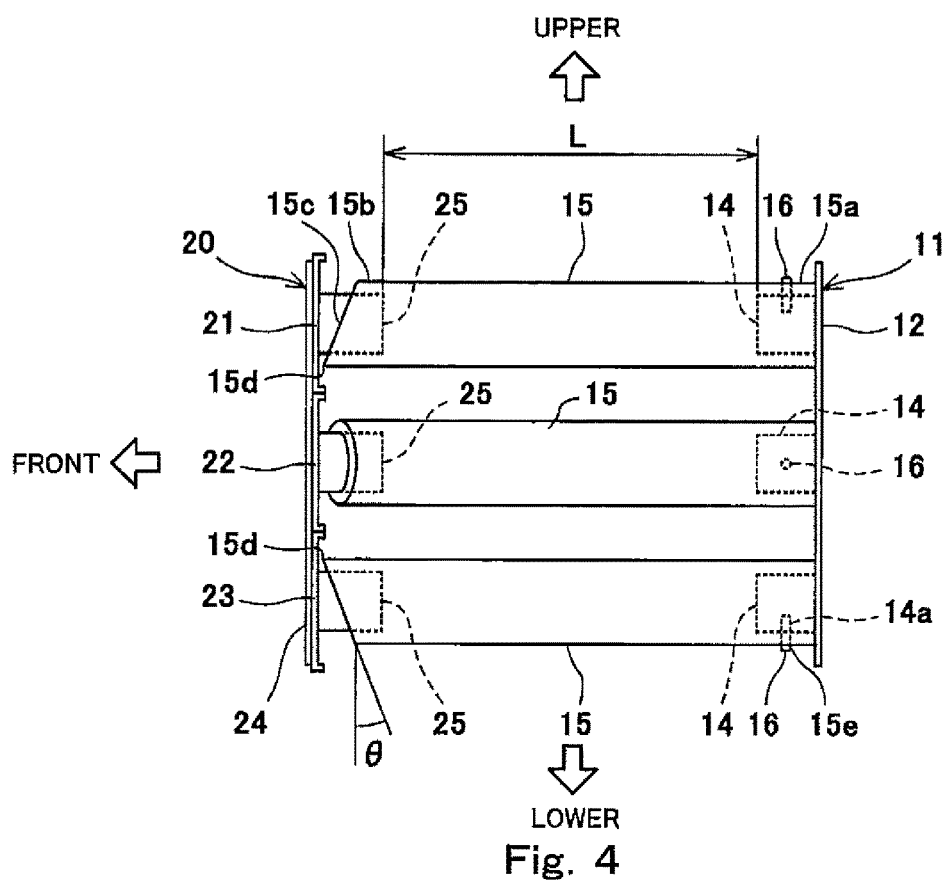
FIG. 4 is a side view of the collision energy absorbing device shown in FIG. 3.

FIG. 3 is a perspective view of the collision energy absorbing device 10 shown in FIG. 1. FIG. 4 is a side view of the collision energy absorbing device 10 shown in FIG. 3. As shown in FIGS. 3 and 4, the collision energy absorbing device 10 includes: a plurality of tubular absorbers 15 provided in parallel with one another so as to extend in a rail direction (forward/rearward direction) that is a traveling direction of the railcar; a base member 11 supporting rail direction rear end portions 15a of the tubular absorbers 15; a front plate member 20 provided so as to face front end portions 15b of the tubular absorbers 15 from the front side; and a holding device 30 configured to position the front plate member 20 such that the front plate member 20 faces the front end portions 15b of the tubular absorbers 15 from the front side. The collision energy absorbing device 10 is a unit including a module, most of members of the module being the same as one another. The entire collision energy absorbing device 10 is laterally long when viewed from the front side.

The base member 11 includes a plate-shaped base plate portion 12 and a plurality of fit supporting portions 14 projecting in the forward direction from the base plate portion 12. The base plate portion 12 is provided orthogonal to the axial direction of the tubular absorber 15. The axial direction of the tubular absorber 15 does not have to completely coincide with the forward/rearward direction and may be slightly inclined relative to the forward/rearward direction. The base plate portion 12 is provided with a plurality of fixation holes 12a for fixing the collision energy absorbing device 10 to the collision posts 5. The base plate portion 12 is provided with locking portions 13 to which rear end portions of below-described restricting members 29 (for example, wires) are locked. In the present embodiment, each of the locking portions 13 has a hook shape.

The fit supporting portions 14 are fitted to the rear end portions 15a of the tubular absorbers 15 from a rear side to support the rear end portions 15a. Each of the fit supporting portions 14 has an outer periphery shape similar to an inner periphery shape of the tubular absorber 15 and is inserted into the rear end portion 15a of the tubular absorber 15. The size of an outer shape of the fit supporting portion 14 is such that an entire periphery of the outer shape contacts an inner peripheral surface of the tubular absorber 15 so as to slide on the inner peripheral surface of the tubular absorber 15. The fit supporting portion 14 has a tubular shape (for example, a cylindrical shape) and is firmly fixed to a front surface of the base plate portion 12.

The base plate portion 12, the locking portions 13, and the fit supporting portions 14 are made of metal and firmly fixed to one another by welding. A rotation preventing mechanism 16 configured to prevent the tubular absorber 15 from rotating relative to the fit supporting portion 14 in a circumferential direction is provided between the fit supporting portion 14 and the rear end portion 15a of the tubular absorber 15. Specifically, the rotation preventing mechanism 16 is realized by inserting an insertion member 16 (for example, a pin or a screw) into a hole 14a of the fit supporting portion 14 and a hole 15e of the tubular absorber 15.

The plurality of tubular absorbers 15 are the same in material, shape, and size as one another. The tubular absorbers 15 are made of fiber-reinforced resin (for example, CFRP). Fibers of the fiber-reinforced resin includes: 0° direction materials extending in a crush direction (forward/rearward direction); and 90° direction materials extending in a direction orthogonal to the crush direction. The 0° direction materials mainly absorb the collision energy, and the 90° direction materials mainly bundle the 0° direction materials. Therefore, in the tubular absorber 15, the 0° direction materials are larger in amount than the 90° direction materials. For example, the 0° direction materials and the 90° direction materials are stacked such that a ratio of the 0° direction materials to the 90° direction materials is 5:1.

The tubular absorber 15 has an annular cross section. An end surface of the rear end portion 15a of the tubular absorber 15 is orthogonal to the axial direction (rail direction) of the tubular absorber 15. All of the end surfaces of the rear end portions 15a of the tubular absorbers 15 are located on the same virtual vertical surface and are the same in forward/rearward direction position as one another. Each of end surfaces 15c of the front end portions 15b of the tubular absorbers 15 includes regions different in forward/rearward direction position from one another. In the present embodiment, the end surfaces 15c of the front end portions 15b of the tubular absorbers 15 are inclined by a predetermined inclination angle θ relative to a direction orthogonal to the axial direction of the tubular absorber 15. To be specific, the end surface 15c has a tapered shape inclined relative to the virtual vertical surface. It is preferable that the inclination angle θ be small. It is preferable that the inclination angle θ be 0°<θ<30° (for example, 15°).

The plurality of tubular absorbers 15 are provided such that when viewed from the front side, at least one tubular absorber 15A among the plurality of tubular absorbers 15 is surrounded by tubular absorbers 15B among the plurality of tubular absorbers 15. In the present embodiment, the tubular absorbers 15 are lined up in at least three stages that are an upper stage, a middle stage, and a lower stage. At each stage, the plurality of tubular absorbers 15 are lined up in a lateral direction (leftward/rightward direction). These tubular absorbers 15 are provided parallel to one another. A posture of one tubular absorber 15 in a rotational direction around the axis of the tubular absorber 15 may be different from a posture of at least one other tubular absorber 15.

Specifically, the tubular absorbers 15 at the upper stage are provided such that front ends 15d (tip ends) of the tubular absorbers 15 are located at a lower side. The tubular absorbers 15 at the lower stage are provided such that the front ends 15d are located at an upper side. Among the tubular absorbers 15 at the middle stage, the tubular absorbers 15 located at both ends in the lateral direction are provided such that the front ends 15d are located at an inner side in the lateral direction. Among the tubular absorbers 15 at the middle stage, the tubular absorbers 15A surrounded by the tubular absorbers 15B from upper, lower, left, and right sides are provided such that the front ends 15d are located at a lower side in the present embodiment although the postures of the tubular absorbers 15A in the rotational direction around the axes of the tubular absorbers 15A do not especially have to be determined.

The front plate member 20 faces the front end portions 15b of the plurality of tubular absorbers 15 from the front side and is provided orthogonal to the axial direction of the tubular absorber 15. The front plate member 20 is not fixed to the front end portion 15b of at least one of the plurality of tubular absorbers 15 and is directly fixed to the front end portions 15b of the other tubular absorbers 15 or is fixed (for example, adhered) to the front end portions 15b of the other tubular absorbers 15 through guide members 25. The number of tubular absorbers not fixed to the front plate member 20 is larger than the number of tubular absorbers fixed to the front plate member 20. Specifically, only the front end portions 15b of the tubular absorbers located at four corners when viewed from the front side among the plurality of tubular absorbers 15 are fixed to the front plate member 20. It should be noted that the front plate member 20 may not be fixed to the front end portions 15b of the tubular absorbers 15 at all.

The front plate member 20 is integrally provided with the plurality of guide members 25 as the holding device 30. The guide members 25 position the front plate member 20 relative to the tubular absorbers 15 in a direction orthogonal to the rail direction. Specifically, the guide members 25 project from the front plate member 20 in a rearward direction and are fitted to the front end portions 15b of the tubular absorbers 15 from the front side so as to be slidable. Each of the guide members 25 has an outer periphery shape similar to an inner periphery shape of the tubular absorber 15 and is inserted into the front end portion 15b of the tubular absorber 15. The size of an outer shape of the guide member 25 is such that an entire periphery of the outer shape contacts the inner peripheral surface of the tubular absorber 15 so as to slide on the inner peripheral surface of the tubular absorber 15. The guide member 25 has a tubular shape (for example, a cylindrical shape) and is firmly fixed to the front plate member 20. Bending rigidity of the front plate member 20 may be arbitrary, but it is preferable that the bending rigidity of the front plate member 20 be higher than the bending rigidity of the base plate portion 12.

Specifically, the front plate member 20 includes: a plurality of divided plates 21 to 23 provided in the upward/downward direction; and a cover plate 24 stacked on these divided plates 21 to 23. When viewed from the front side, each of the divided plates 21 to 23 is long in the lateral direction. Ribs 21b and 21c projecting in the rail direction are formed at upper and lower ends of the divided plate 21, respectively (see FIG. 7). Ribs 22b and 22c projecting in the rail direction are formed at upper and lower ends of the divided plate 22, respectively (see FIG. 7). Ribs 23b and 23c projecting in the rail direction are formed at upper and lower ends of the divided plate 23, respectively (see FIG. 7). The divided plates 21 to 23, the cover plate 24, and the guide members 25 are made of metal and firmly fixed to one another by welding.

The front plate member 20 is positioned relative to the tubular absorbers 15 in the direction orthogonal to the rail direction in such a manner that the guide members 25 are fitted to the front end portions 15b of the tubular absorbers 15 from the front side. It should be noted that the number of guide members 25 be smaller than the number of tubular absorbers 15. Specifically, regarding the tubular absorbers 15 at the middle stage, the guide members 25 are not provided so as to correspond to the tubular absorbers 15A surrounded by the tubular absorbers 15B from the upper, lower, left, and right sides. To be specific, the front end portions 15b of the tubular absorbers 15A to which the guide members 25 are not fitted are not positioned in the direction orthogonal to the rail direction. Further, peripheral walls of the tubular absorbers 15 and peripheral walls of the guide members 25 are parallel to the forward/rearward direction (axial direction).

The guide members 25 are located far away from the base member 11 in the forward/rearward direction. A distance L between the guide member 25 and the base member 11 in the forward/rearward direction denotes a maximum stroke of the tubular absorber 15 in the forward/rearward direction at the time of the crush. In the present embodiment, the distance L is larger than an entire length of the guide member 25 in the forward/rearward direction and is 50 to 90% of the entire length of the tubular absorber 15. Further, a rear end surface (tip end surface) of the guide member 25 faces an internal space of the tubular absorber 15. The front plate member 20 compresses the tubular absorbers 15 in the rearward direction to crush the tubular absorbers 15 in the forward/rearward direction. At this time, the guide members 25 position the tubular absorbers 15 in the radial direction but do not compress the tubular absorbers 15 in the forward/rearward direction. An outer peripheral surface of the guide member 25 is located at a radially inner side of the inner peripheral surface of the tubular absorber 15. Therefore, the guide members 25 do not inhibit intended crush operations of the tubular absorbers 15.

The restricting members 29 connecting the front plate member 20 and the base member 11 to each other are provided as the holding device 30 between the base member 11 and the front plate member 20. The restricting members 29 partially connect an outside portion of the front plate member 20 and an outside portion of the base member 11 to each other such that a group of the plurality of tubular absorbers 15 is exposed in outward directions orthogonal to the rail direction. To be specific, the restricting members 29 do not surround the group of the plurality of tubular absorbers 15 from outside.

The front plate member 20 is provided with locking portions 26 (see FIG. 7) located at positions corresponding to the positions of the locking portions 13 provided at the base member 11. In the present embodiment, each of the locking portions 26 has a hook shape. Rear end portions of the restricting members 29 are locked to the locking portions 13 of the base member 11, and front end portions of the restricting members 29 are locked to the locking portions 26 of the front plate member 20. With this, the restricting members 29 extend between the locking portions 13 and 26. Thus, the restricting members 29 prevent the front plate member 20 from being separated from the tubular absorbers 15 in the forward direction beyond a predetermined position.

The restricting members 29 are formed so as to be lower in strength than the tubular absorbers 15. To be specific, when the front plate member 20 moves in a direction toward the base member 11, the restricting members 29 are less likely to become resistance as compared to the tubular absorbers 15. The resistance of the restricting member 29 applied to the movement of the front plate member 20 when the front plate member 20 pushes the tubular absorbers 15 in the rearward direction is smaller than the resistance of the restricting member 29 applied to the movement of the front plate member 20 when the front plate member 20 moves in the forward direction away from the tubular absorbers 15 beyond a predetermined position. In the present embodiment, the restricting member 29 is a wire. Therefore, when the front plate member 20 moves in a direction toward the base member 11, the restricting member 29 does not generate resistance. When the front plate member 20 moves in a direction away from the base member 11, the restricting member 29 that is the wire is tensioned. With this, the front plate member 20 is prevented from being separated from the tubular absorbers 15 in the forward direction beyond a predetermined position. In the present embodiment, the restricting members 29 restrict the movement of the front plate member 20 in the forward direction such that the guide members 25 are not pulled out from the front end portions 15b of the tubular absorbers 15.

Figure 5:
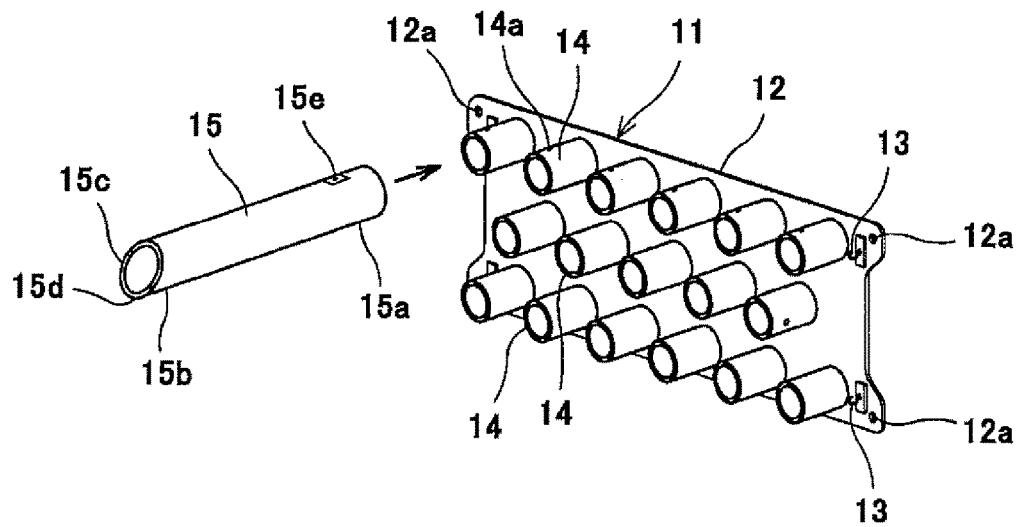
FIG. 5 is a perspective view for explaining how to assemble the collision energy absorbing device shown in FIG. 3.
Figure 6:
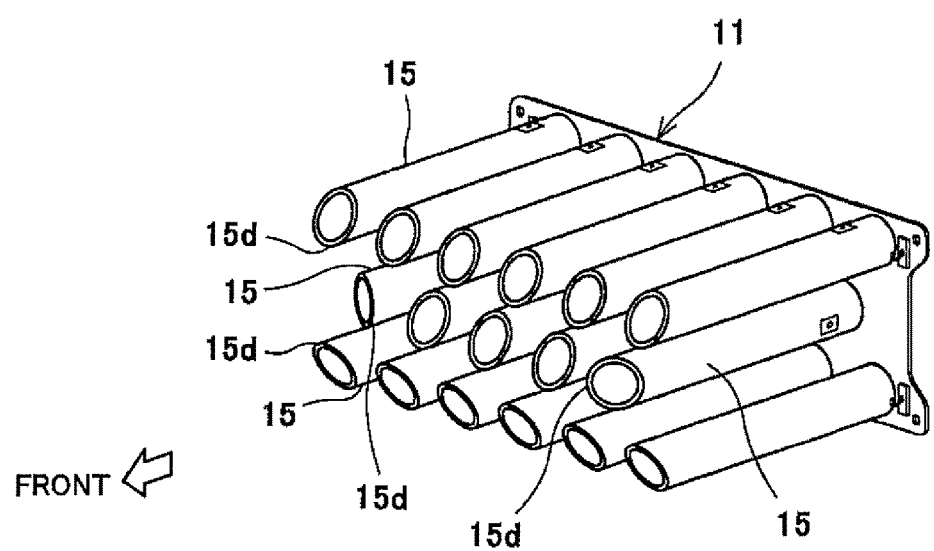
FIG. 6 is a perspective view for explaining how to assemble the collision energy absorbing device shown in FIG. 3.

FIGS. 5 to 8 are perspective views for explaining how to assemble the collision energy absorbing device 10 shown in FIG. 1. As shown in FIGS. 5 and 6, first, the rear end portion 15a of the tubular absorber 15 is fitted to the fit supporting portion 14 of the base member 11 from the front side. Then, the hole 15e of the tubular absorber 15 is matched with the hole 14a of the fit supporting portion 14, and the insertion member 16 (see FIG. 4) is inserted into the holes 14a and 15e. The posture of the tubular absorber 15 in the rotational direction around the axis of the tubular absorber 15 is described as above. The front ends 15d of all the tubular absorbers 15 are the same in forward/rearward direction position as one another.

Figure 7:
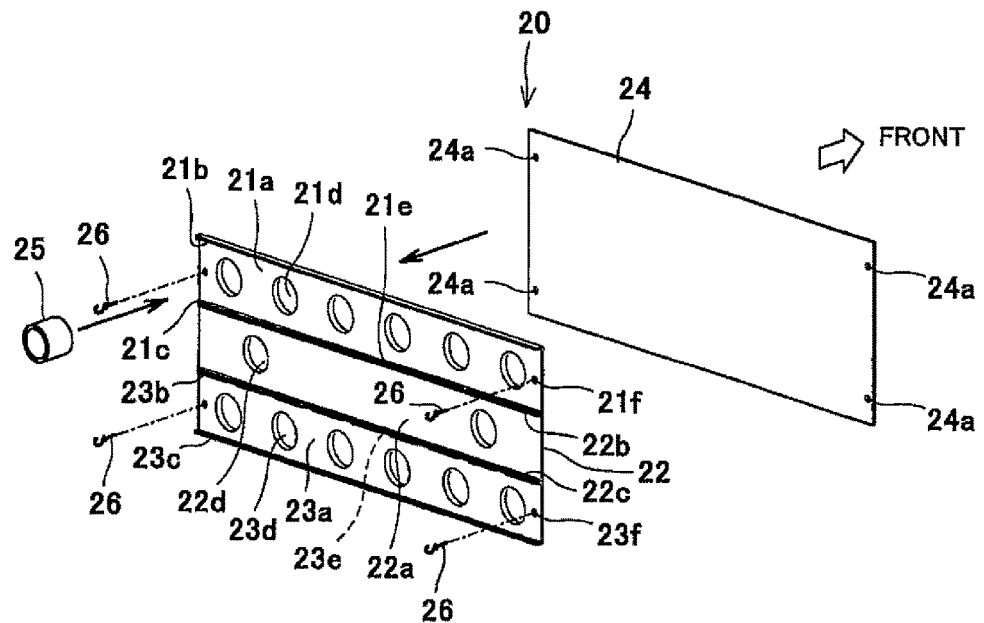
FIG. 7 is a perspective view for explaining how to assemble the collision energy absorbing device shown in FIG. 3.

As shown in FIG. 7, the front plate member 20 includes a plurality of divided plates 21 to 23. Each of the divided plates 21 to 23 includes: a main body plate portion (21a, 22a, 23a) orthogonal to the forward/rearward direction; the rib (21b, 22b, 23b) projecting from the upper end of the main body plate portion (21a, 22a, 23a) in the rearward direction; and the rib (21c, 22c, 23c) projecting from the lower end of the main body plate portion (21a, 22a, 23a) in the rearward direction. Circular holes (21d, 22d, 23d) to which the guide members 25 are fitted are formed at required positions of the main body plate portion (21a, 22a, 23a). A plurality of cutout portions 21e are formed at the lower rib 21c of the divided plate 21 at the upper stage so as to be provided at intervals in the lateral direction, and a plurality of cutout portions 23e are formed at the upper rib 23b of the divided plate 23 at the lower stage so as to be provided at intervals in the lateral direction.

The ribs 22b and 22c of the divided plate 22 at the middle stage are exposed at the cutout portions 21e and 23e, and the divided plates 21 to 23 are welded to one another along peripheral edges of the cutout portions 21e and 23e. Screw holes (21f, 23f, 24a) are formed at required positions of the divided plates 21 and 23 and the cover plate 24. The locking portions 26 that are hooks with screws are threadedly engaged with the screw holes 21f, 23f, and 24a. The cover plate 24 is stacked on the divided plates 21 to 23 to be welded to the divided plates 21 to 23. The guide members 25 are fitted to the holes 21d, 22d, and 23d of the divided plates 21 to 23 to be welded to the divided plates 21 to 23.

Figure 8:
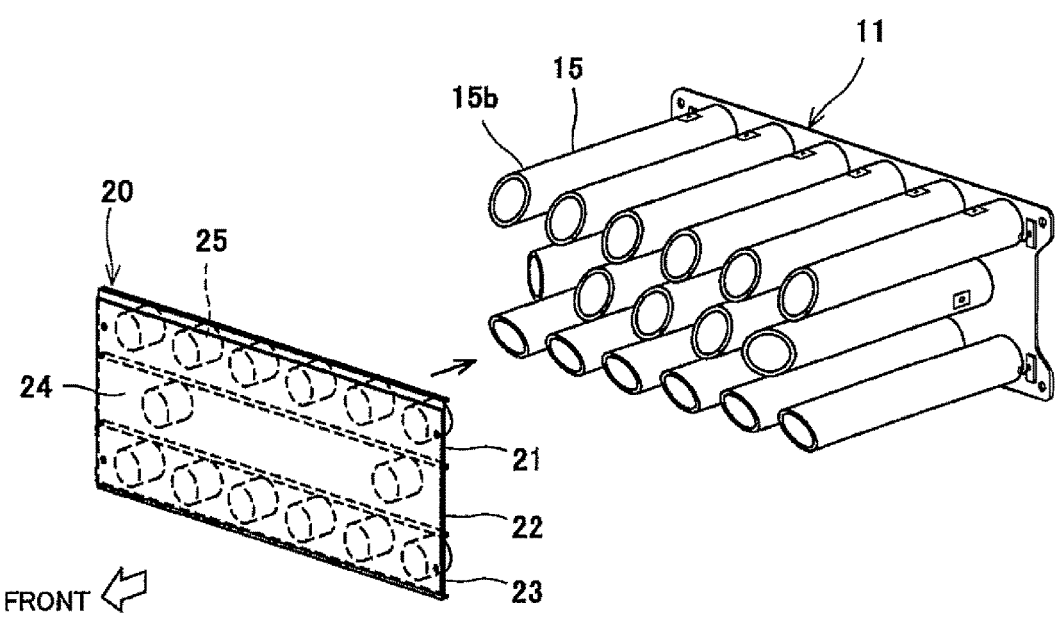
FIG. 8 is a perspective view for explaining how to assemble the collision energy absorbing device shown in FIG. 3.

As shown in FIG. 8, the front plate member 20 produced as above is brought close from the front side to the tubular absorbers 15 supported by the base member 11, and the guide members 25 are fitted to the front end portions 15b of the tubular absorbers 15. Then, each of the restricting members 29 constituted by the wires is provided so as to extend between the locking portion 13 of the base member 11 and the locking portion 26 (see FIG. 7) of the front plate member 20. With this, the assembling of the collision energy absorbing device 10 is completed.

Next, an operation of absorbing the collision energy by the collision energy absorbing device 10 will be explained. For example, if the railcar 1 including the collision energy absorbing device 10 collides head-on with the other railcar traveling on the same railway track or collides with an obstacle, a large impact in the rearward direction acts on the front plate member 20. By this impact, the front plate member 20 is displaced in the rearward direction. However, since the plurality of guide members 25 are fitted to the plurality of tubular absorbers 15, the posture of the front plate member 20 during this displacement is stabilized. Since the front plate member 20 is not fixed to the front end portions 15b of the tubular absorbers 15, the reinforced fibers of the tubular absorbers 15 are not strongly restrained by the front plate member 20. Therefore, when the front plate member 20 is displaced to crush the tubular absorbers 15, unintended buckling deformation of the tubular absorbers 15 are suppressed, and the reinforced fibers of the tubular absorbers 15 are successively and adequately destroyed.

To be specific, according to the conventional energy absorber made of metal, the absorber gradually repeats buckling to absorb the energy. Therefore, a load transferred by the absorber from certain buckling until the next buckling significantly varies. With this, since the strength of the bodyshell is designed in consideration of a peak value of the load variation, reinforcement of the bodyshell needs to be increased. However, in the present embodiment, since the tubular absorbers 15 are made of fiber-reinforced resin, and the reinforced fibers of the tubular absorbers 15 are continuously destroyed at the time of the crush, the variation of the load transferred by the tubular absorbers 15 is suppressed, and a crush characteristic in which the load variation is small is obtained. Therefore, an average load during the crush of the tubular absorbers 15 is increased, and the collision energy is adequately absorbed. In addition, since a peak load is reduced, the reinforcement of the bodyshell can be reduced. Further, each of the end surfaces 15c of the front end portions 15b of the tubular absorbers 15 has a tapered shape. Therefore, when the crush of the tubular absorbers 15 starts, a contact area between the front plate member 20 and the tubular absorbers 15 gradually increases, and an initial peak load is reduced.

According to the above-explained configuration, the front plate member 20 is not fixed to the tubular absorbers 15 made of fiber-reinforced resin and is provided so as to face the front ends 15d of the tubular absorbers 15 from the front side. Therefore, at the front end portions 15b of the tubular absorbers 15, the reinforced fibers of the tubular absorbers 15 are prevented from being strongly restrained by the front plate member 20. On this account, the unintended buckling deformation of the tubular absorbers 15 by the displacement of the front plate member 20 at the time of the collision is suppressed, and the reinforced fibers of the tubular absorbers 15 can be adequately destroyed. Thus, the reinforced fibers are adequately destroyed at the time of the collision, and stable and highly-efficient energy absorption can be realized. The front plate member 20 is positioned by the holding device 30 so as to face the front ends 15*d* of the tubular absorbers 15 from the front side. Therefore, even though the front plate member 20 is not fixed to the tubular absorbers 15, the front plate member 20 can be caused to stand by for the collision so as to face the tubular absorbers 15 from the front side.

Further, the guide members 25 which position the front plate member 20 relative to the tubular absorbers 15 in the direction orthogonal to the rail direction are provided as the holding device 30. Therefore, without fixing the front plate member 20 to the tubular absorbers 15, the front plate member 20 can be easily caused to stand by so as to face the tubular absorbers 15 from the front side. The guide members 25 are integrally provided at the front plate member 20 and fitted to the front end portions 15*b* of the tubular absorbers 15 from the front side. Therefore, the posture of the front plate member 20 and the postures of the tubular absorbers 15 are stabilized during the crush, and the guide members 25 guide the destroyed fibers of the tubular absorbers 15 during the crush so as to spread the destroyed fibers in a radially outward direction. Thus, the guide members 25 serve to define a crush mode. The plurality of guide members 25 are not provided so as to correspond to the tubular absorbers 15A surrounded by the tubular absorbers 15B. Therefore, the weight reduction can be realized by the reduction in the number of guide members 25.

The restricting members 29 which prevent the front plate member 20 from being separated from the tubular absorbers 15 in the forward direction beyond a predetermined position are provided as the holding device 30. Therefore, without fixing the front plate member 20 to the tubular absorbers 15, the front plate member 20 can be easily caused to stand by at an appropriate position relative to the tubular absorbers 15. Further, the restricting members 29 are formed to be lower in strength than the tubular absorbers 15 and connect the front plate member 20 and the base member 11 to each other. Therefore, when the front plate member 20 moves in a direction toward the base member 11 at the time of the collision to crush the tubular absorbers 15, the restricting members 29 are less likely to become resistance against the movement of the front plate member 20. Thus, the restricting members 29 can be prevented from influencing on crush behaviors of the tubular absorbers 15.

The base member 11 includes the fit supporting portions 14 that are fitted to the rear end portions 15*a* of the tubular absorbers 15 from the rear side to support the rear end portions 15*a*. Therefore, the rear end portions 15*a* of the tubular absorbers 15 can be easily supported by the base member 11.

The present invention is not limited to the above embodiment, and modifications, additions, and eliminations may be made within the scope of the present invention. In the present embodiment, the collision energy absorbing device 10 is attached to the front portion of the bodyshell 2 of the head car but may be attached to a front portion of a bodyshell of a coupled car. Even when the collision energy absorbing device 10 is attached to the front portion of the bodyshell 2 of the head car, the position at which the collision energy absorbing device 10 is attached is not limited to the collision posts 5 and may be any member such as the underframe as long as the member can endure the impact to some extend at the time of the collision. The base member 11, the front plate member 20, and the guide members 25 are made of metal but may be made of fiber-reinforced resin. The rotation preventing mechanism 16 is the insertion member 16 but is not limited to this as long as the rotation preventing mechanism 16 can prevent the rotation of the tubular absorber 15 relative to the fit supporting portion 14. For example, each of a cross section of a fit portion of the fit supporting portion 14 and a cross section of a fit portion of the tubular absorber 15 may have a non-true circular shape (for example, a polygonal shape) which prevents the relative rotations of the fit supporting portion 14 and the tubular absorber 15, the fit portions being fitted to each other.

The base member 11 may be a part of the bodyshell 2. The restricting member 29 is not limited to the wire and may be a coil spring or a rod which is lower in strength than the tubular absorber 15. The restricting member 29 may be a plate (for example, a rubber plate) which is lower in strength than the tubular absorber 15 and may surround the group of the plurality of tubular absorbers 15. The guide members 25 are internally fitted to the tubular absorbers 15 but may be externally fitted to the tubular absorbers 15. When the guide members 25 are configured to be internally fitted to the tubular absorbers 15, the outer diameter of the guide member 25 can be made small, and this can contribute to space saving and weight reduction. In addition, influences on the crush behaviors of the tubular absorbers 15 can also be reduced. The positions of the front ends 15*d* of the plurality of tubular absorbers 15 in the forward/rearward direction are the same as one another but may be different from one another.

The method of firmly fixing the divided plates 21 to 23, the cover plate 24, and the guide members 25 to one another is not limited to the welding and may be mechanical fastening, adhesion, or the like as long as the strength is satisfied. In the front plate member 20, the plurality of divided plates 21 to 23, the cover plate 24, and the guide members 25 are firmly fixed to one another but may be integrally configured. The base plate portion 12, the locking portions 13, and the fit supporting portions 14 may be fixed to one another by mechanical fastening or adhesion or may be integrally formed.

INDUSTRIAL APPLICABILITY

As above, the collision energy absorbing device of the railcar according to the present invention has an excellent effect of being able to realize stable and highly-efficient energy absorption by adequate destruction of the reinforced fibers at the time of the collision. Therefore, it is useful to widely apply the collision energy absorbing device according to the present invention to railcars that can achieve the significance of this effect.

REFERENCE SIGNS LIST 1 railcar
10 collision energy absorbing device
11 base member
14 fit supporting portion
15 absorber
20 front plate member
25 guide member
29 restricting member
30 holding device

The invention claimed is:

1. A collision energy absorbing device of a railcar, the collision energy absorbing device comprising:
   at least one absorber made of fiber-reinforced resin and provided so as to extend in a rail direction;
   a base member supporting a rear end portion of the absorber in the rail direction;
   a front plate member not fixed to a front end portion of the absorber and provided so as to face the front end portion of the absorber from a front side; and
   a holding device configured to position the front plate member such that the front plate member faces the front end portion of the absorber from the front side, wherein:
   the guide member has an outer periphery shape similar to an inner periphery shape of the absorber and is inserted into the front end portion of the absorber; and
   an outer periphery surface of the guide member contacts an inner peripheral surface of the absorber such that the outer periphery surface of the guide member slides on the inner peripheral surface of the absorber.

2. The collision energy absorbing device according to claim 1, wherein the holding device includes a guide member provided so as to correspond to the absorber and configured to position the front plate member relative to the absorber in a direction orthogonal to the rail direction.

3. The collision energy absorbing device according to claim 2, wherein the guide member is provided at the front plate member and is fitted to the front end portion of the absorber from the front side.

4. The collision energy absorbing device according to claim 3, wherein:
   the absorber is one of a plurality of absorbers;
   the plurality of absorbers are provided parallel to one another so as to extend in the rail direction;
   when viewed from the front side, at least one of the plurality of absorbers is provided so as to be surrounded by the other absorbers;
   the guide member is one of a plurality of guide members;
   the plurality of guide members are smaller in number than the plurality of absorbers; and
   the plurality of guide members are not provided so as to correspond to the at least one absorber surrounded by the other absorbers.

5. The collision energy absorbing device according to claim 1, wherein:
   the absorber is one of a plurality of absorbers;
   the plurality of absorbers are provided parallel to one another so as to extend in the rail direction;
   the front plate member is provided so as to face front end portions of the plurality of absorbers from the front side; and
   the front plate member is not fixed to the front end portion of at least one of the plurality of absorbers but is fixed to the front end portions of the other absorbers.

6. The collision energy absorbing device according to claim 1, wherein the holding device includes a restricting member configured to prevent the front plate member from being separated from the absorber beyond a predetermined position.

7. The collision energy absorbing device according to claim 6, wherein:
   the restricting member connects the front plate member and the base member to each other; and
   the restricting member is formed to be lower in strength than the absorber.

8. The collision energy absorbing device according to claim 1, wherein the base member includes a fit supporting portion fitted to the rear end portion of the absorber from a rear side to support the rear end portion.

9. The collision energy absorbing device according to claim 1, wherein the holding device includes a guide member provided so as to correspond to the absorber and configured to position the front plate member relative to the absorber in a direction orthogonal to the rail direction; and
   the guide member are fitted to the front end portion of the absorber from the front side so as to be slidable.

10. The collision energy absorbing device according to claim 1, wherein the holding device includes a restricting member configured to prevent the front plate member from being separated from the absorber beyond a predetermined position; and
    the restricting member connects the front plate member and the base member to each other and are located between the base member and the front plate member.

11. The collision energy absorbing device according to claim 10, wherein the restricting members partially connect an outside portion of the front plate member and an outside portion of the base member to each other such that a group of the absorber is exposed in outward directions orthogonal to the rail direction.

12. The collision energy absorbing device according to claim 1, wherein the holding device includes a restricting member configured to prevent the front plate member from being separated from the absorber beyond a predetermined position;
    the front plate member and the base member are provided with locking portions respectively; and
    a rear end portion of the restricting member is locked to the locking portion of the base member, and a front end portion of the restricting member is locked to the locking portion of the front plate member.

13. The collision energy absorbing device according to claim 10, wherein the restricting member includes a wire.

14. The collision energy absorbing device according to claim 1, wherein an end surface of the front end portion of the absorber has a tapered shape.

15. The collision energy absorbing device according to claim 1, wherein the at least one absorber includes a plurality of absorbers; and
    the plurality of absorbers are provided such that at least one absorber among the plurality of absorbers is surrounded by the other absorbers among the plurality of tubular absorbers when viewed from the front side of the device.

16. A collision energy absorbing device of a railcar, the collision energy absorbing device comprising:
    at least one absorber made of fiber-reinforced resin and provided so as to extend in a rail direction;
    a base member supporting a rear end portion of the absorber in the rail direction;
    a front plate member not fixed to a front end portion of the absorber and provided so as to face the front end portion of the absorber from a front side; and
    a holding device configured to position the front plate member such that the front plate member faces the front end portion of the absorber from the front side, wherein:
    the holding device includes a restricting member configured to prevent the front plate member from being separated from the absorber beyond a predetermined position; and the restricting member connects the front plate member and the base member to each other and is located between the base member and the front plate member.

* * * * *